S. V. TENCH.
SPROCKET CHAIN.
APPLICATION FILED MAY 19, 1919.
1,348,189.
Patented Aug. 3, 1920.
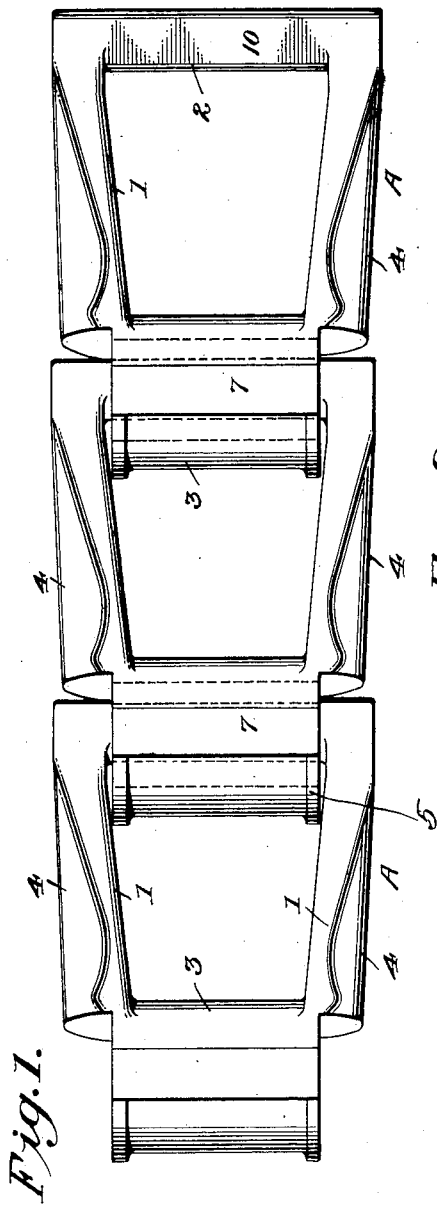
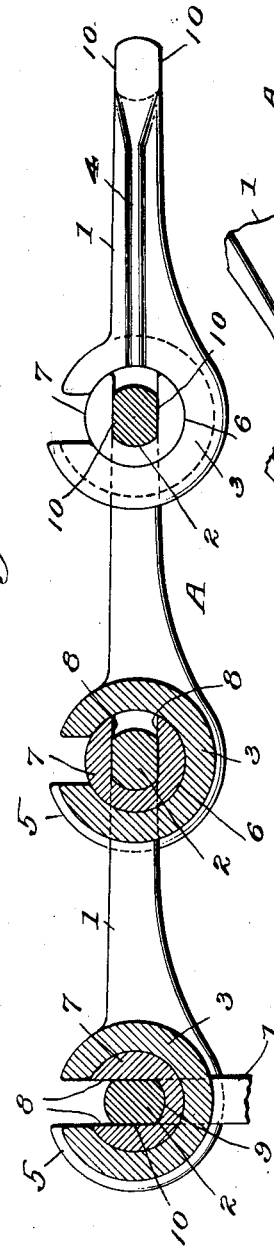
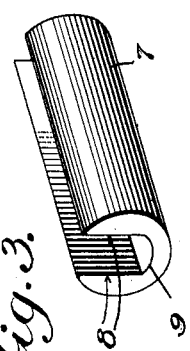
WITNESSES:
Jos. F. Collins
INVENTOR
Samuel V. Tench
BY
Ralph E. Warfield.
ATTORNEY

UNITED STATES PATENT OFFICE.

SAMUEL V. TENCH, OF WILKES-BARRE, PENNSYLVANIA.

SPROCKET-CHAIN.

1,348,189.  Specification of Letters Patent. Patented Aug. 3, 1920.

Application filed May 19, 1919. Serial No. 298,244.

*To all whom it may concern:*

Be it known that I, SAMUEL V. TENCH, a citizen of the United States, residing in the city of Wilkes-Barre, Luzerne county, Pennsylvania, have invented new and useful Improvements in Sprocket-Chains, of which the following is a specification.

One of the objects of the present invention is to provide a chain, the links of which are more easily and quickly connected and disconnected than heretofore.

Another object is to provide a chain wherein the bearing elements, when worn, may be more readily removed and new ones substituted therefor.

Still another object is to provide a chain which may be readily applied to sprocket wheels now in use for driving chains of other makes.

In accomplishing these ends, I have provided a novel chain, of a simplified, and improved design.

In the drawings, Figure 1 is a plan view of several links constructed in accordance with my invention, and assembled to form a section of a chain;

Fig. 2 is a longitudinal sectional view therethrough;

Fig. 3 is a detail perspective of the removable bushing, and

Fig. 4 is a fragmentary perspective view of the hooked projection with which each link is provided.

My invention is particularly designed as a conveyer chain for use in collieries, or in connection with other mines, where it is subjected to the action of water impregnated with sulfur and other injurious chemicals, although its use is by no means restricted thereto.

After considerable experiment, the mining industry has practically adopted a type of chain known as the Ewart chain, as a standard, and any chain designed to be substituted for the Ewart chain, must have a pitch similar to the Ewart chain, to enable it to be used with the present sprocket wheels, and thus avoid the necessity of replacing such wheels.

One end of each link in a Ewart chain, as now manufactured and sold, is equipped with a hook-like extension of less width than the link, the cross bar closing the opposite end of the link being of greater diameter than the opening between the bill and the shank of the hook of the adjacent link to prevent accidental disconnection therefrom.

Therefore, to enable the links of the Ewart chain to be connected, the side bars of the links, at their points of connection with the cross bars, are laterally or transversely recessed to reduce their thickness at such points.

To assemble the links in a chain, one link is held at substantially right angles to the adjacent link and the cross bar of the first-named link inserted endwise into the hook of said adjacent link, the lateral recesses permitting the cross bar to be thus slid into the hook, after which the first-named link is rocked downwardly into alinement with the second-named link to enable its side bars to embrace and lie on opposite sides of the hook.

From the foregoing, it will be seen that when it is desired to replace a worn or otherwise damaged link, considerable slack must be provided to permit the raising of the damaged link to a position at right angles to its adjacent link, and the subsequent lateral displacement of the damaged link to effect its disconnection from the hook of the next link.

When the chain is in use, the cross bars of the links work in the hooked projections of their adjacent links and wear thin, especially when subjected to the chemical action of sulfur-impregnated water, so as to require the substitution of new links in a comparatively short time, to prevent breakage under the strain caused by the pull of the sprockets and the weight of the material being conveyed, and also to prevent accidental disconnection due to any slight buckling or jar. And the worn links can only be scrapped, as they cannot be used again.

The wear takes place on the cross bar and the hook, but whereas the hooks are of sufficient thickness to outwear several cross bars, the cross bars are comparatively thin and the entire link must be discarded when the cross bars wear thin.

To avoid the expense incurred in replacing the entire link, it has been suggested that each hook like projection be equipped with a bushing rotatably mounted therein and being slotted, first, to enable its insertion into the hook through the opening between the end of the bill and the shank, and secondly, so that the slot may serve, when registered with the opening, to form a seat for the cross bar of the adjacent link, opposite faces of the cross bar being flattened to fit against the parallel straight-sided walls of the slot in the bushing, whereby to prevent the cross bar from turning relatively to the bushing, and causing the wear to take place between the bushing and the hook in which it turns.

In effect, this amounts to equipping the cross bars with removable sleeves, which when worn, may be removed and new sleeves substituted therefor, thus saving the entire link and materially lengthening the life of the chain at a comparatively small expense.

My invention is designed as an improvement on the form of chain last described.

The bushings of the prior chain are worked into the hooks by first fitting the slot in the bushing over the bill or lip of the hook, and then turning the bushing on the bill and forcing it into the bend or bow of the hook.

This not only necessitates a reduction in the thickness of the lip of the hook to enable it to enter the slot, with a consequent reduction in the strength and wearing life of the hook, but also, after the bushing is once seated in the hook, it is very difficult indeed to remove.

Therefore, to improve the prior construction, both as regards facility of assemblage and disassemblage, and also in strength and wearing qualities, I have devised the following novel arrangement.

Referring to the accompanying drawing, my improved link is designated as a whole, as A, and comprises the side bars 1, 1 connected at one end by a cross bar 2, the side bars preferably converging at their opposite ends and merging into a hooked extension 3 of a width slightly less than the space between the side bars at their point of connection with the cross bar.

Certain of the links may be provided with the usual form of brackets (not shown) to which the conveyer blades may be secured, and the side bars may each be equipped with longitudinally extending strengthening ribs 4, 4. Also, the opposite side edges of the hooked extensions 3 may be provided with exterior reinforcing beads 5, 5, and the thickness of the hook at its lip or free end is substantially the same as that of the body of the hook, see Figs. 2 and 4.

The inside circumference 6 of the hook is cylindrical and unobstructed from end to end, as shown in Fig. 4, to form a bearing for a cylindrical bushing 7 (Fig. 3) insertible axially of its length or endwise, from either end of the similarly-shaped bearing 6.

The bushing 7 may coincide in length with the bearing 6 which extends the full width of the hook, the bushing being longitudinally slotted, with opposed straight-sided walls 8, connected at their inner ends by a web 9, preferably having an arcuate contour.

The bushing 7 is freely rotatable and axially shiftable in either direction, in its bearing 6, and is inserted in the bushing with the opening in its slot in register with the opening between the lip of the hook and the shank thereof, the edges of the latter conveniently forming extensions of the side walls 8, 8 of the slot, as shown at the left in Fig. 2.

The upper and lower faces 10, 10 of the cross bar 2 of each link are flattened in parallel planes, (see Fig. 2) which planes also lie parallel with the longitudinal plane of the link, the thickness of the cross bar between its flattened faces approximately corresponding to the distance between the parallel walls 8, 8 of the slot in the bushing, and to the opening between the lip and the shank of the hook.

In assembling the links to form a chain, the hooked projection of one link is inserted into the opening between the side bars 1, 1 of another link, with the cross bar 2 of the last-named link arranged above the opening in the hook, at which time, the two links may lie at substantially right angles to one another. Such angular relation, however, depends upon the location of the opening in the hooked extension, and by forming such opening at other than right angles to the longitudinal plane of the link, the angular relation of the links when being coupled together is varied.

The cross bar 2 of the last-named link is then drawn through the opening in the hook and seated in the slot in the bushing 7, the side bars 1, 1 embracing the ends of the hook to prevent endwise displacement of the bushing 7 relatively to the hook, at which time the links occupy the relative positions shown at the extreme left of Fig. 2. The flattened side walls 10 of the cross bar abutting the corresponding walls 8 of the bushing, prevent relative rotation of the bushing and cross bar, and when the links are brought into alinement, the cross bar turns the bushing to the position shown at the right in Fig. 2, to displace the slot of the bushing relatively to the mouth of the hook, and thereby lock the links together, the curvature of the outer edge of the cross bar conforming approximately to the curvature of the bearing 6 in the hook, and the curvature of the inner edge of the cross bar conveniently conforming to the arcuate web 9.

A reversal of the foregoing operation results in disconnecting the links, and such disconnection is effected without necessitating the provision of as much slack in the chain, as was heretofore required.

The depth of the slot or groove in the bushing 7 may be greater than the thickness of the cross or end bar 2, if desired, as illustrated in Fig. 2, whereby the outer edge of the cross bar is spaced apart from the inner periphery 6 of the knuckle or hook 3 when in use, to prevent any possibility of wear between the end bar and hook.

It will also be noted that the inner face of the cross bar which sustains the greatest strain in the operation of the chain, is protected by the web 9 of the bushing, and that the flattened sides of the end bar lie substantially in the plane of draft on the chain.

My improved chain is assembled and disassembled with greater ease and dispatch than similar chains heretofore devised; is much simpler and easier to construct; is just as surely locked against disconnection, and the replacement of the bearings 7 far more speedily and easily effected, whereby the length of time during which the chain is out of use, is considerably reduced.

What I claim as new, is:—

1. In a drive or conveyer chain, a rigid integral link, comprising side bars, a cross bar to connect the side bars near one end thereof, the cross bar having oppositely flattened faces; and a hook or coupling to connect the opposite ends of the side bars, the hook or coupling having a cylindrical bearing the cross bar being of sufficient width to easily pass through the opening between the bill and the shank of the hook; a cylindrical bushing of greater diameter than the width of the opening between the bill and the shank of the hook, and insertible endwise into the bearing through one end thereof, independently of the cross bar, for free rotation in the bearing, the bushing having formed longitudinally thereof a radial slot with flattened side walls and of a width substantially as great as the width of the opening between the bill and shank of the hook, to register therewith and form a seat for the cross bar of the adjacent link, the latter adapted to be freely inserted into, and removed from, its seat in the bushing, through the opening between the bill and shank of the hook and rotatable with the bushing, to interpose that part of the bushing forming the bottom wall of the slot, between the inner face of the cross bar and the bearing in the hook, the flattened sides of the cross bar confronting the flattened side walls of the bushing, the cross bar being loosely seated in the bushing to permit the ready disengagement of the cross bar from the bushing and its removal through the opening between the bill and shank of the hook, while the bushing lies in the bearing in the hook, and thereby enable the substitution of a new bushing.

2. A drive or conveyer chain, including rigid links, each of which comprises side bars, an end bar and a hook or coupling, formed integrally; the end bar having two opposite longitudinal side faces flattened to occupy parallel planes, the hook or coupling having a cylindrical bearing; and a cylindrical bushing of greater diameter than the width of the opening between the bill and the shank of the hook, and insertible and removable endwise relatively to the bearing in the hook, through one end of the bearing, independently of the end bar, and freely rotatable in the bearing, at all times, the bushing having a slot, the side walls of which lie in parallel planes spaced apart a sufficient distance to snugly accommodate the end bar of the adjacent link, the flattened sides of which end bar confront the flattened walls of the slot, the end bar adapted for insertion and removal through the opening between the bill and shank of the hook independently of the bushing in which it loosely rests, and rotatable with the bushing, to interpose the bottom wall of the bushing between the inner face of the end bar and the bearing in the hook in the plane of draft of the chain.

3. A drive or conveyer chain, including rigid links, each of which comprises side bars, a cross bar and a hook or coupling, formed integrally; the cross bar having a flattened face, the hook or coupling having a cylindrical bearing; and a cylindrical bushing insertible and removable endwise relatively to the bearing in the hook, through one end of the bearing, independently of the cross bar, and freely rotatable in the bearing, at all times, the bushing having a slot, one wall of which is flattened, the slot having a width sufficient to snugly accommodate the cross bar of the adjacent link, the flattened side of which cross bar confronts the flattened wall of the slot, the cross bar adapted for insertion and removal through the opening between the bill and shank of the hook and rotatable with the bushing, to interpose one wall of the bushing between the inner face of the cross bar and the bearing in the hook in the plane of draft of the chain, the slot in the bushing being of greater depth than the diameter of the cross bar between its inner and outer faces, whereby the outer face of the cross bar adjacent the open end of the slot lies apart from the bearing in the hook when the chain is in operation.

SAMUEL V. TENCH.